Oct. 25, 1966          R. GUNN          3,281,780
SYNCHRO-MAGNETIC GUIDANCE AND LANDING SYSTEMS FOR AIRCRAFT
Filed March 31, 1964          2 Sheets-Sheet 1
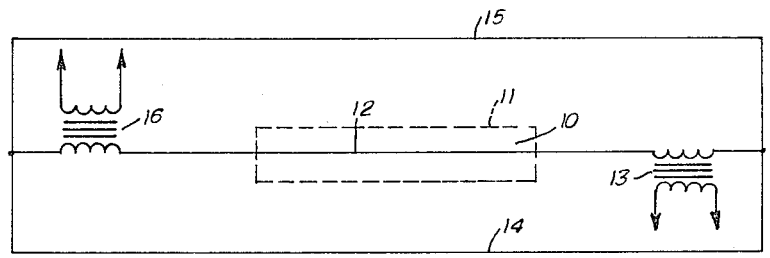
FIG. 1 (PRIOR ART)
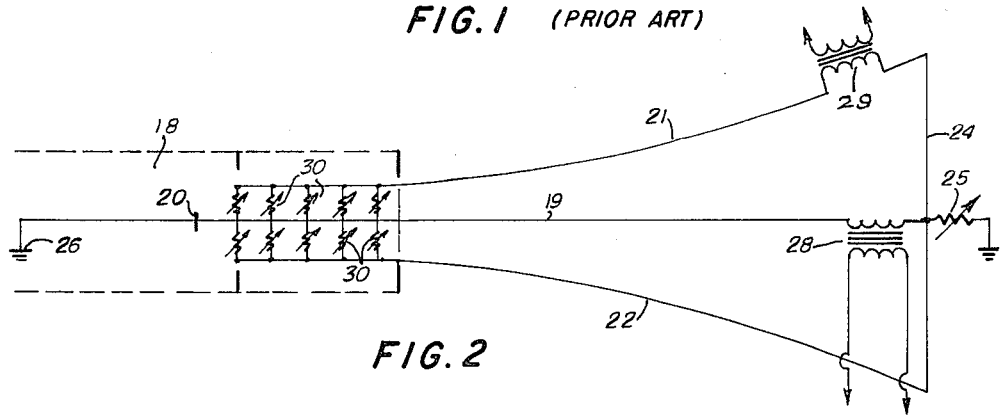
FIG. 2
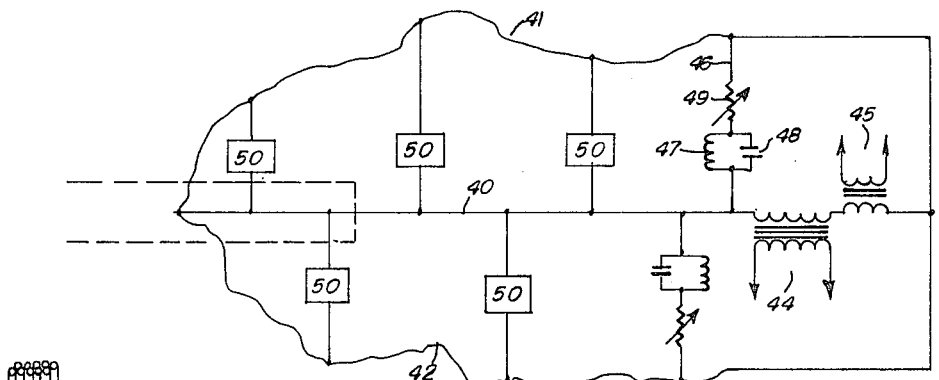
FIG. 3
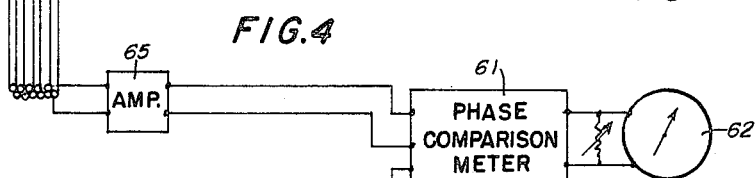
FIG. 4
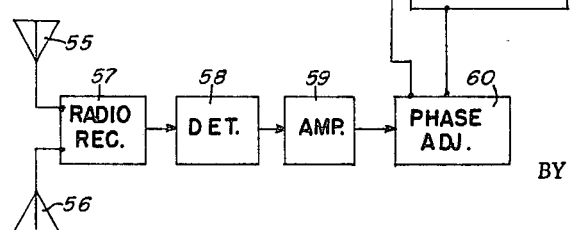
INVENTOR
ROSS GUNN
by
Fred E. Shoemaker
ATTORNEY

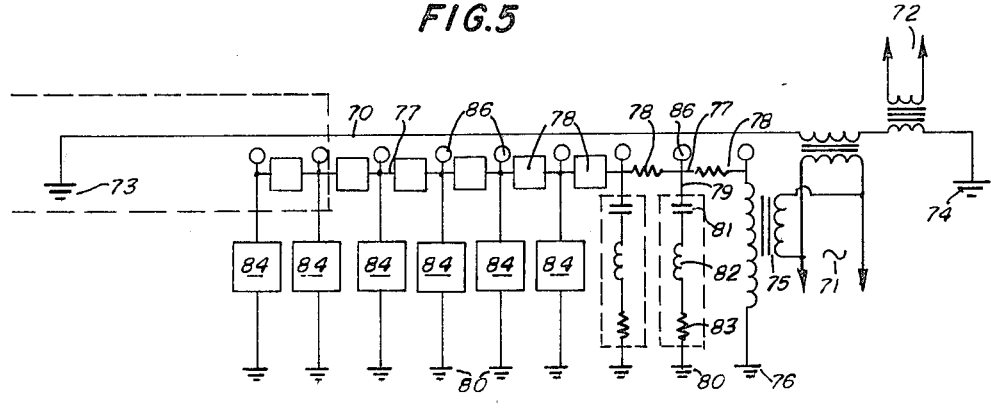
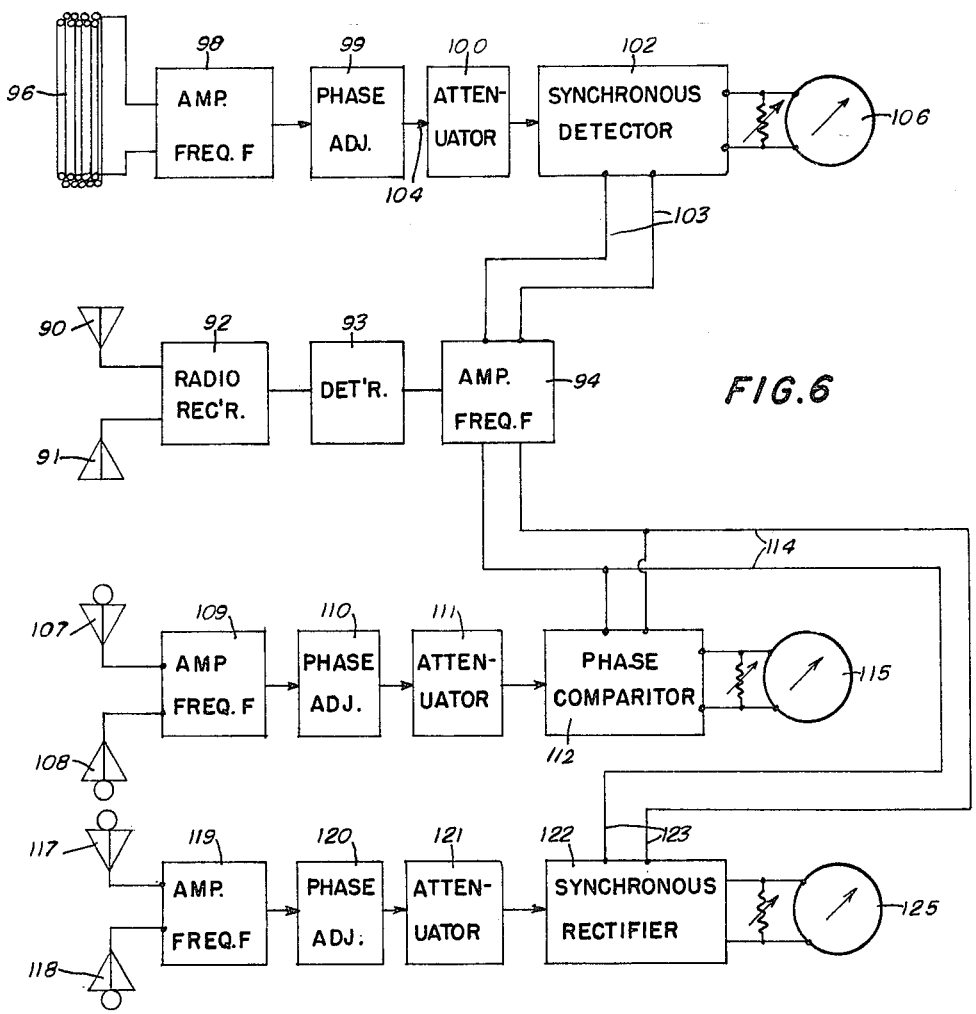

United States Patent Office 3,281,780
Patented Oct. 25, 1966

3,281,780
SYNCHRO-MAGNETIC GUIDANCE AND
LANDING SYSTEMS FOR AIRCRAFT
Ross Gunn, 4437 Lowell St. NW., Washington, D.C.
Filed Mar. 31, 1964, Ser. No. 356,156
20 Claims. (Cl. 340—26)

This invention relates to guidance systems and more particularly to such systems for facilitating the landing of aircraft, of primary importance when visibility is poor or substantially non-existent, but, extremely useful at other times to lessen the burden on an otherwise overworked piloting team.

It is a general object of the present invention to provide guidance systems and apparatus capable of establishing signals in space indicative to the pilot of an aircraft, or capable of influencing auto-piloting equipment thereon, whereby the craft may be maintained on a predetermined guide slope path to a touch-down point on a landing strip.

More particularly, the invention contemplates the establishment in such a guide slope path of a transverse, horizontal, magnetic field pattern and/or a substantially equivalent electrostatic field pattern for use as a landing guide.

One of the features of the first-mentioned field is its ability to cooperate with aircraft carried detecting equipment to indicate lateral deviation and direction from the path as well as yaw.

Another feature of the system provides for indication aboard the craft, its altitude at any time the craft is on the guide slope path.

A further feature of some of the systems includes the constant indication on the craft of the distance remaining to runway touch-down, an extremely valuable bit of information during low visibility conditions.

The invention contemplates the achievement of the various guidance, altitude, distance and other signals by the cooperation of apparatus aboard the aircraft capable of responding to and combining signals of two or more characteristics including magnetic, electrostatic and radio.

Other and further objects, features and details of the inventions will be more apparent to those skilled in the art upon a consideration of the following specification and the accompanying drawings wherein are disclosed several exemplary embodiments of the inventions with the understanding that such changes therein and combinations thereof may be made as fall within the scope of the appended claims without departing from the spirit of the inventions.

In said drawings:

FIGURE 1 is a schematic and diagrammatic plan view of a landing strip equipped with a rudimentary guidance system without guide slope indication;

FIGURE 2 is a plan view of one end of a landing strip and a downward electrical system capable of cooperating with aircraft carried apparatus to provide guidance, yaw detection and glide slope indication to a touch-down spot on the strip;

FIGURE 3 is a plan view of another arrangement of electrical system on said in advance of a landing strip and equipped to provide guidance, yaw detection, and direct indication of altitude and distance to touch-down when the aircraft follows its transverse, horizontal, magnetic field pattern of substantially uniform intensity along the predetermined glide slope trajectory;

FIGURE 4 is a schematic and diagrammatic illustration of that portion of aircraft carried equipment used for responding to signals from the system of FIGURE 3 to indicate the distance from the designated point of touch-down;

FIGURE 5 is a diagrammatic and schematic plan view of circuits and equipment extending in advance of the desired touchdown spot on a landing strip and additionally provided with distributed electrostatic signalling means for transmitting, to an aircraft, signals varying in controlled intensity and phase with distance from touchdown, to be compared on the craft with signals of fixed phase to thereby indicate and distance; and FIGURE 6 is a schematic and diagrammatic showing of aircraft borne detecting equipment capable of providing the live or auto-pilot with the same types of information as described in connection with the arrangement shown in FIGURE 3, when supplied with signals from the ground system illustrated in FIGURE 5.

Increasing traffic and tighter scheduling of flights at most all civilian and military airports and landing strips demand all-weather landing and guidance systems of superior quality capable of providing more information of higher reliability and utility to either the pilot or to an auto-pilot to permit landings under all conditions in a minimum of time.

In my Patent No. 3,079,586, "Locating and Guidance Systems for Vehicles for Air, Sea and Land," granted February 26, 1963, there is disclosed air strip equipment capable of defining a predetermined vertical landing path plane or a helicopter vertical guidance signal.

In my Patent No. 3,116,473, granted December 31, 1963, there is disclosed additional guidance apparatus and also yaw detection means. These patents should be referred to for disclosures of aircraft borne apparatus suitable for use with the ground equipment of the present invention, at least for altitude, lateral guidance and yaw indication. For the following of a guide slope path and indication of distance to touch-down other airborne equipment is required as will be later described.

Reference may now be had to FIGURE 1 of the accompanying drawings for an understanding of the elements of guidance, yaw detection and altitude indication as set forth in the mentioned patents. A landing strip is shown at 10 having a threshold position 11 for an aircraft approaching from the right. A guide conductor 12 is arranged on the surface, buried or supported on poles, and extends at least downwind a greater distance than shown beyond or in advance of position 11 and carries an alternating current of a frequency in the sonic or sub-sonic range provided from a power source through transformer 13 and auxiliary or return conductors 14 and 15, normally carried on poles and arranged more or less parallel to 12 to carry two alternating currents of the same phase as the guide conductor. A small transformer 16 is arranged to be excited by current in guide conductor 12 to modulate a small radio transmitter in synchronism with current in 12.

The circuits are entirely metallic and arranged so that the main current in 12 is in substantially the same time phase throughout its length. Return conductors 14, 15 are usually spaced about a thousand feet from the guide conductor and preferably symmetrical whereby to provide a magnetic field above and adjacent the guide conductor permitting aircraft borne apparatus, as described in the above-mentioned patents, to produce right and left hand guidance signals, true altitude and yaw angle indications. Such an arrangement, however, cannot establish a guide slope since the magnetic field about the guide conductor is of uniform size and strength throughout the length of the conductor.

In order to establish a glide slope path useful for landing aircraft and still available for all the information described in connection with FIGURE 1 and the noted patents, means must be provided to progressively decrease the horizontal transverse magnetic field above and near the central guide conductor as the aircraft advances toward the touch-down point on the landing strip.

FIGURE 2 illustrates how this may be done by providing the landing strip 18 with a central or main guide conductor 19 which extends along the ground downwind therefrom for several thousand feet. At a desired touch-down point 20 on the strip the return current wires 21, 22 may be joined to conductor 19 and splayed outwardly downwind, preferably along concave lines as shown and are cross-connected to each other and to 19 by conductor 24, which may then be connected to ground through variable resistor 25. Beyond touch-down point 20 the central conductor may be extended to a ground connection at 26 to provide a small current down the runway to guide the aircraft during its runout if visibility is poor.

Transformer 28 is provided for energizing the system and transformer 29 for modulating a radio transmitter, all as explained in the patents and in connection with FIGURE 1 herein. Each return conductor 21, 22 carries substantially one-half of the current from guide conductor 19 and of opposite instantaneous polarity whereby to counteract in part the magnetic field of the former with increasing effect as their spacing decreases. At the downwind end the lateral spacing is so great that, given any sort of satisfactory guidance signal, principally the field of the main conductor will be picked up at nearly full intensity. However, any lateral deviation from the correct path above conductor 19 will be instantly apparent on the craft. Because of the opposite polarity of the return wires, any false effort to follow one of them will be indicated on the craft and correction can be made.

If the return conductors are directly connected to the main conductor as suggested above, the sensitivity to path deviation becomes too great as touch-down is approached and the craft cannot be held accurately over the guide conductor. It is thus preferred to deflect the return conductors, as shown in FIGURE 2, at some distance before touch-down, so they are substantially parallel to the guide conductor and sufficiently far away so as not to produce extreme sensitivity to small lateral deviations. Connections to the guide conductor are then made through a plurality of longitudinally spaced, adjustable, bleed resistors 30 so as to gradually reduce the current in the main guide conductor and thus decrease sensitivity without seriously changing the guide slope, although adjustments of these resistors may be also used to effect a curving approach to the runway level to effect "flare-out" as often desired.

In the above arranged system for effecting a guide slope signal, the angle of approach to touch-down may be, but is not necessarily, controlled by the approximate angles between the main and return conductors. In any event it should be apparent that the pilot flying in such a way as to maintain nearly constant, the measured horizontal component of the magnetic field transverse to the line of flight, will continuously and progressively lose altitude substantially to the point of contact. Right and left guidance data are not impaired and a precise information on the crab angle (yaw) may be accomplished using only the craft borne equipment of the previously noted patents.

Where, as is frequently the case, it is impossible to obtain a suitable right of way or have a terrain that is suitable to practice the system of FIGURE 2, essentially the same result in producing a glide path can be attained by using the system of FIGURE 3, where the main guide conductor 40 is arranged downwind from touch-down, as before, but the return conductors 41 and 42 need not have any special configuration and may follow irregular streets or the like, except that they should normally provide a more or less symmetrically divided current return, at some distance from the main guide conductor to the input power and radio energizing transformers 44 and 45 used as in FIGURE 2. These conductors are here presumed to be so far away from the guide conductor as to have but little effect on its field or on the airborne equipment.

The main guide conductor is connected at intervals, and preferably alternately, to the return conductors by branch conductors, such as 46, each containing a parallel connected inductance 47 and capacitance 48 in series with an adjustable resistor 49. These various impedances are sized or adjusted so that each successive section of conductor 40, approaching the runway, carries less current than the previous one. Many of the combinations of impedances are shown merely as blocks 50 for convenience.

If the voltage applied by transformer 44 has a constant and known frequency, the current flowing in each branch and returning to the transformer 44 through conductors 41 and 42 may be determined both theoretically or experimentally, so that it is possible to design the circuits so that the current in the main guide conductor decreases progressively in the direction of the approach of an aircraft. Ideally the circuit constants might be distributed uniformly along the guide conductor, but the step configuration shown is known to be satisfactory because the magnetic sensors carried on an aircraft, say between two guide conductor sections, average out the response produced by the field excited, for example, by the sections. Accordingly, this arrangement will generate a glide path suitable for landing an aircraft even when it is impossible to place the return conductors in ideal positions so that their counter-fields will influence the field of the guide conductor. It is emphasized that by using different constants in the branch circuits 46, the current and its phase in each section of the guide conductor can be controlled to give a wide variety of patterns along this conductor to thus impart special characteristics to the glide path.

Methods of calculating the currents which will flow in the sections of the guide conductor have been widely discussed in the literature and are easily carried out, for example, in a text book by George W. Pierce, entitled "Electric Oscillations and Electric Waves," McGraw-Hill, 1920. This gives all the expressions and design constants necessary to determine the current in each sector of the main conductor as well as the effective velocity of propagation and relative phases of the current wave down the main guide conductor.

The system of FIGURE 3 benefits by the fact that the current wave down the guide conductor does not travel at a velocity approximating that of light because of the branch circuits attached to it at intervals, i.e., the conductor is "loaded and the velocity can easily be reduced by a factor of 100 or 1000 through appropriate design (see Pierce's book). Experiment shows that if the frequency is of the order of 100 cycles per second and the distance is a mile or more, then it is easy to design the branch circuits for a phase delay or a quarter cycle between the approach and far ends of the guide conductor.

The voltage induced in magnetic sensors carried on an aircraft moving along and near the guide conductor will reflect the change in phase of the alternating current which induces the voltage. The sensors respond largely to those current elements closest to them and thus by comparing the time phase of the A.C. voltage induced in the sensors on the aircraft with the phase transmitted thereto by a radio wave modulated from the guide wire current and travelling at a velocity nearly that of light, the approximate position of the aircraft in relation, say, to the touch-down point may be immediately determined. Thus a meter comparing these phases may be readily calibrated in terms of distance to an arbitrarily fixed touch-down point.

FIGURE 4 depicts the airborne equipment necessary to measure the distance from the instantaneous position of the craft to the point of touch-down. It includes radio antenna 55, 56 feeding receiver 57 and detector 58 for recovering the modulated frequency transmitted by the radio carrier as defined in Patent No. 3,079,586. This frequency is amplified at 59 and fed to phase adjuster 60 to match it to the phase of the guide conductor at the touch-down point before delivery to the phase comparison meter 61 which contains amplifier and clipper circuits to tailor the incoming signal for use in the phase meter proper 62.

Also aboard the craft is a magnetic sensor or induction coil 64 oriented to be responsive to the horizontal, transverse, magnetic field of that portion of the guide conductor 40 closest to the coil. The signal induced in this coil has substantially the time phase of the current in that portion of the guide conductor closest to the aircraft. The induced signal is amplified in 65 and fed into a second circuit of the phase comparison meter 61, which, by known methods, actuates the meter 62 to indicate the recurring time difference between the maxima of current or voltage in the two systems. If 60 is properly adjusted as noted above, then the meter 62 can be calibrated in terms of distance to the point of touch-down.

No special arrangement of the return conductors is necessary for the proper operation of the system if the branch conductors are connected to "load" the guide conductor in accordance with the Pierce book and if the return conductors 41 and 42 are some distance from 40. If the guide conductor is very long the phase differences could have multiple values but this normally should not be allowed to happen by selection of appropriate values for loading. Thus, for maximum simplicity it is desirable to hold the phase change throughout the length of the guide conductor to less than 90 electrical degrees. Commercially available phase meters can readily measure one-fourth of an electrical degree and therefore the phase displacement throughout the length of the guide conductor need not exceed about 20 degrees to achieve a practical accuracy. A phase difference between the ends of the guide conductor of from 30 to 80 degrees is ideal, but does require that the loading circuits be accurately designed for the specific frequency flowing in the guide conductor.

The system described above in connection with FIGURES 3 and 4, for indicating the distance to touch-down, is very effective but expensive because all of the loading circuits, etc., must be designed to operate at low frequency and carry considerable current and so the elements are heavy, bulky and expensive. To accomplish the same result an alternate system may compare the phase between a modulated reference signal transferred to the craft either by radio or magnetic induction, with a signal of exactly the same frequency, derived from the power source exciting the guide conductor, and, transferred to the craft by electrostatic induction.

By using open conductors for the electrostatic signal source, carried on poles and extending closely adjacent to and parallel to a main guide conductor, used for generating magnetic signals, the approaching aircraft can be in both a magnetic and an electrostatic field, which latter can induce, on antenna electrodes attached to the craft, voltages large enough to operate low frequency amplifiers having high input impedance. These electrostatically induced voltages may perform the same synchronizing and time reference functions as the voltage induced in the magnetic sensors of FIGURE 4, when compared with the modulated fixed frequency transmitted to the craft via radio. Such a system achieves many economies resulting from the low current flowing in all circuits which will permit a series of ground connections for branch current returns rather than the use of a metallic return circuit for the currents in the "loading" branches. Moreover, all current carrying components can be substantially reduced in size. If feasible, a metallic return circuit is preferable and only a single conductor is needed.

The electrostatic method usually requires high voltage and the open, excited conductor cannot be electrostatically shielded from the aircraft so that in areas where the craft is required to be at a sufficient altitude the conductor can be well insulated and mounted on poles; but closer to the touch-down point it can be laid on the ground along the landing strip. Here the reduction in the useful range of the resulting electrostatic field with standard amplifiers on the craft, while normally reduced to about 400 feet is still adequate for the final landing and runout.

This system, like the one shown in FIGURE 3 is capable of providing lateral guidance, yaw indication, and distance to touch-down, and because of a programmed continuous reduction in electrostatic field strength a satisfactory glide slope landing path is established as described in connection with that figure.

The electric field intensity produced near a long wire supported at a distance above the ground and charged by a high alternating voltage with respect to the ground is readily shown to establish a vertical electric field above the wire which is proportional to the wire height and the applied voltage; and to the capacity per unit length of the wire that is actually exposed to the surroundings. (Lumped capacity does not contribute.)

Thus, by progressively adjusting the height of the highly charged wire and/or its exposed capacity per unit length (by well known procedures) it is easy to secure an electric field intensity distribution above and in the vicinity of the wire that will produce a predetermined electric field along the wire and thus a useful guide slope configuration that may be interpreted on the aircraft by measuring the instantaneous electric field.

Reference should now be had to FIGURE 5 for a showing of a useful system for establishing the required electrostatic field adjacent to and paralleling a main guide conductor 70, shown similar to the one in FIGURE 1, energized from source 71 the same way and equipped at 72 to modulate a radio transmitter. However, it is simplified by the use of grounds 73, 74 at each end of 70, although metallic return conductors may be used as previously described.

From the same power source 71 a high voltage, step-up transformer 75 delivers a potential of from 10,000 to 100,000 volts between ground 76 and one end of the open wire transmission line 77 which is appropriately loaded by series resistors 78, between each two of which a branch circuit 79 extends to a ground 80 and is loaded by series connected capacitor 81, inductance 82 and resistor 83, or other impedance combinations as required. Blocks 84 in some branches represent the sum of such impedances. The values of the various loading devices are so chosen that the velocity of propagation down the transmission line is such as to produce normally a phase displacement of from 30 to 80 degrees in the length of transmission line 77. The loading devices may all have different circuit constants to effect a desired and predetermined pattern of phase displacement. They may be calculated in value in accordance with well known principles.

The intensity of the electrostatic field from a wire like 77 is expressed by the following equation:

$$E = \text{electric field} = \frac{(\text{A.C. voltage on wire})(\text{height of wire})(\text{exposed capacity per unit length})}{(\text{Altitude of airplane})^2 - (\text{height of wire})^2}$$

The first two factors in the numerator are limited for obvious reasons but the third may be increased with no great difficulty. Thus, in FIGURE 5 the small circuits 86 represent exposed capacity elements to extend the radius of the effective electric field, and may comprise several parallel wires stretched between poles and extending either alongside of or transverse to wire 77. With greater difficulty wire 77 may be increased in height or energized with a higher voltage or both.

Guidance and yaw detection are effected as in the patents referred to and as in earlier illustrated embodiments, making use of the electromagnetic signals from guide wire 70. The glide slope pattern is similar to that resulting from the showing in FIGURE 3, but achieved through the higher voltage electrostatic system, to the field of which an antenna on the aircraft is continuously exposed while travelling near the high voltage conductor 77 which parallels the guidance wire 70. Direct measurements show that the high voltage sets up a usefully large electric field for a distance of 1500 feet from a pole-supported conductor when the voltage applied thereto is approximately 75,000. The voltage induced on the aircraft antenna exposed to such a field easily operates an amplifier of high input impedance to provide a synchronizing signal which may be fed to a phase meter to permit comparison of the phase in that part of the transmission line closest to the craft, with a reference signal derived from guide conductor 70 or from a radio signal modulated from the same source as used to supply 70.

In order to extract useful information on the aircraft from the above described space-varying electric field established by the high voltage conductor circuits on the ground it is clear that the local electric field intensity must be continuously measured and displayed on the aircraft. This is accomplished by the use of induction antennas mounted on the aircraft at such positions and so oriented with respect to the fuselage as to have established thereon small electrostatic voltages which can be amplified by high impedance amplifiers. Such signals of electrostatic origin are fed into appropriate circuits and means are provided to display their magnitude or they may be used to operate an automatic piloting system.

The system just described will provide lateral guidance, yaw detection, distance to touch-down, and slope line guidance without the requirement that the value or phase of the current in guide conductor 70, or high voltage conductor 77, be constant at all points. However, to measure true altitude above a current carrying conductor it is generally necessary to have a uniform current therein for its full length. This derives from the fact that a loaded transmission line, showing a progressive change in phase, as is necessary to measure distance along it, also exhibits a progressive change (reduction) in the total current throughout its length. Thus, a loaded line is not normally suited for measuring altitude unless a correction, depending on the position of the aircraft, is introduced to allow for the changing current amplitude. Such corrections are not ordinarily practical so the present embodiment of the invention relies upon the constant current and phase in guide conductor 70, as outlined in the Gunn patents noted.

FIGURE 6 shows a schematic arrangement of apparatus aboard aircraft using the ground based equipment of FIGURE 5, and capable of simultaneously measuring true altitude above the wire and the distance to touch-down. Other guidance signals are obtained as previously described in this specification and the noted patents. In this system synchronizing signals are transmitted to the craft by way of a radio carrier modulated by the frequency in guide wires 70 and 77 as shown in FIGURE 5 and the noted patents, and are received by antennas 90, 91, delivered to receiver 92, detector or demodulator 93 and then to amplifier 94 suitable for the audible or sub-audible frequency (F) used.

A second signal, derived from induction coil 96, responsive, for example, to the horizontal, transverse component of the magnetic field produced by the guide conductor 70, as described in connection with FIGURE 1 and its guide conductor 12, is supplied to amplifier 98, then to phase adjuster 99 and to attenuator 100.

A synchronous detector 102, such as described at length in Patent No. 3,079,586, is controlled by the synchronizing signal from amplifier 94, through conductor 103, so that signals from the attenuator 100, supplied to it through conductors 104, are rectified and delivered to meter 106 to produce a reading, dependent on the voltage induced in coil 96, which as has previously been shown, can be used to measure true altitude above the guide conductor if the craft is properly so positioned.

If coil 96 is so oriented as to measure the horizontal component of the magnetic field transverse to the guide wire 70 then, as above, altitude may be ascertained from the reading of meter 106. If oriented to measure the vertical component lateral guidance is available from the meter, while if the coil is oriented to respond to the longitudinal component then the meter will designate yaw angle. The meter can easily be provided with multiple graduations for the purpose and coil 96 may be adjustable in position or a plurality of fixed coils arranged for selective connection to amplifier 98.

Simultaneously, electrostatic signals from the high voltage transmission line 77 are received on antennas 107, 108 on the craft from adjacent portions of the line 77. They are amplified in 109, adjusted in phase in 110, attenuated in 111 and delivered to the phase comparator 112, there to be compared with the substantially constant phase signal delivered to the aircraft by the modulated radio signal from amplifier 94. Conductors 114 deliver the amplified radio signals to comparator 112, whose output is delivered to meter 115 which measures phase difference which can readily be displayed as distance to touch-down by appropriate calibration. Even though the overall length of the ground guidance systems and various airports may be somewhat different, for various reasons, fixed calibration of the dial of meter 115 can still be used, for the phase difference per unit of length of conductor 77 can readily be adjusted to be the same in all ground systems.

In order to detect the guide slope path of substantially constant amplitude which will be provided by the electrostatic field from conductor 77 because of the decreasing current from threshold to touch-down, additional equipment is necessary on the aircraft, as seen at the bottom of FIGURE 6 (which may be frequency selective). Here antennas 117, 118 feed amplifier 119 with electrostatic signals, which when amplified are adjusted in phase in 120, adjusted in amplitude in attenuator 121 and delivered to synchronous detector 122. This detector is connected by conductors 123 to amplifier 94 which provides the synchronizing signals.

The use of a synchronous detector is desirable to insure against pilot error, such as following to power line or the like. However, such a detector will not, under normal conditions, fail to give a response of suitable amplitude even when the measured signal phase deviates as much as 20 degrees from that of the control signal. The synchronous detector is highly desirable because of its straight line response, instead of responding only to the square of the signal amplitude, thereby offering superior results under all conditions.

The output of the synchronous detector 122 is connected to meter 125 which may be calibrated to indicate signal amplitude to permit following to guide slope line referred to above.

It is, however, relatively easy for the pilot to follow his own desired slope knowing both the altitude and distance to touch-down provided as indicated above.

The above description of the several systems emphasize the use of various combinations of magnetic induction, electrostatic induction and electromagnetic radiation to achieve signals that are sign and phase indicative so as to provide guidance and other landing information to a moving aircraft. By making use of the various depicted systems combining two or more of the noted techniques using low frequencies and the equipment outlined above and in the noted prior patents, reliable signals can be made available to a pilot landing an aircraft so that he may be appraised simultaneously of true altitude, distance to touch-down, departure to right or left from the vertical guidance plane, departure vertically from the desired guide slope and the degree of yaw.

While the above descriptions have largely dealt with displaying useful signals to the pilot, it should be noted that these signals can be fed into flight directors or computers, in known manners, to be used directly to control the craft for fully automatic landings.

I claim:

1. For use in establishing a guide slope path for landing an aircraft carrying induction coil means responsive to components of an established magnetic pattern in said path and means indicative of the output of said coil means, in combination, a single guide conductor substantially at ground level and extending from an approach position to and through a touch-down position on a landing strip, means grounding said conductor at runout distance beyond the touch-down position, a pair of return conductors connected to said guide conductor near said touch-down position and diverging on opposite sides thereof toward positions equally laterally displaced from the single guide conductor position and being each there returned to the guide conductor by a lateral conductor near the approach position, means energizing said guide conductor from a source of sonic frequency alternating current of uniform average intensity and of substantially negligible phase change throughout the length of the conductor, a ground near said approach position and means for controlling the current in and connecting said guide and return conductors to said ground.

2. The conductor system of claim 1 in which the angle between the guide conductor and either return conductor is of the order of the desired glide angle of landing approach.

3. The system as defined in claim 2 in which said return conductors present generally convex faces toward each other and the central guide conductor, whereby their fields oppose that of the central conductor in such a manner as to establish a substantially constant magnetic field strength guide slope path gradually approaching the surface of the landing strip.

4. For use in landing an aircraft carrying induction coil means responsive to components of an established flux pattern and means indicative of the output of said coil means, in combination, a single guide conductor extending along the ground projection of a desired flight trajectory, a pair of return conductors substantially symmetrically disposed on opposite sides of said guide conductor, means energizing said guide conductor in one direction and the return conductors in the opposite direction from a source of sonic frequency alternating current, said conductors being so relatively arranged that the predetermined magnetic patterns therefrom partially neutralize each other in such a manner as to establish a spatially constant, transverse magnetic field pattern of uniform intensity along a predetermined glide slope trajectory vertically above said guide conductor and adapted to be detected by said coil for craft guidance indication.

5. The system as defined in claim 4 in which the return wires are splayed outwardly from the guide conductor from positions adjacent it near the desired touch-down position of the guide slope trajectory.

6. The system as defined in claim 5 in which said return wires substantially parallel the guide conductor for a distance prior to the touch-down position and are spaced therefrom a distance sufficient to eliminate critical guidance signals, and bleed impedances connecting each return wire to the guide conductor longitudinally spaced along said parallel portions to modify the magnetic field pattern for proper guide slope for final landing.

7. A system for guiding aircraft along a guide slope trajectory from an approach position to touch-down and for indicating distance along said trajectory to the touch-down point including in combination; a guide conductor extending along the ground projection of a desired flight trajectory downward from said point, a pair of similar return conductors connected to the main conductor near said point and extending remotely along opposite sides thereof, laterally extending means connecting said return and main conductors near the approach position, means so energizing said guide conductor with a fixed sonic frequency alternating current applied thereto near said threshold that current flows therein oppositely to the flow in the returns, branch circuits spaced relatively uniformly along the guide conductor and connected to opposite return conductors, impedance components in each branch sized and connected in such a manner that the current in the guide conductor is progressively decreased from the approach position to touch-down with a consequent continuous change in phase, aircraft-borne apparatus including an induction coil responsive to the horizontal component of the field from said guide conductor when moving in a path substantially vertically above it, means transmitting a signal of the same frequency as that in said main conductor and of constant phase to said aircraft while flying over said conductor toward said touch-down point, and means to continuously compare and indicate the degree of phase difference between the output from said coil and that of the transmitted signal as an indication of the distance remaining to touch-down.

8. The system as defined in claim 7 including additional airborne apparatus for using the magnetic field of said guide conductor to produce signals for lateral guidance, glide slope guidance and yaw indication.

9. A system for guiding aircraft along a guide slope trajectory from an approach position to touch-down and for indicating distance along said trajectory to the touch-down point including in combination, a conductor extending along the ground projection of a desired flight trajectory downwind from said point; means energizing said conductor with a fixed sonic frequency alternating current applied thereto, return path means for completing the conductor circuit while providing a controlled spatial field of less intensity than that of the main conductor, branch circuits spaced relatively uniformily along said conductor and connected to said return path means, reactance components in each branch sized and connected in such a manner that the current in the conductor is progressively decreased from the approach position to touch-down with a consequent continuous change in phase, aircraft-borne apparatus including pickup means responsive to the field from said conductor when moving in a path substantially vertically above it, means transmitting a signal of the same frequency as that in said conductor and of constant phase to said aircraft, and means to continuously compare and indicate the degree of phase difference between the output from said pickup means and that of the transmitted signal as an indication of the distance remaining to the touch-down point.

10. The system of claim 9 in which said sonic frequency alternating current is of sufficiently high potential to extend an electrostatic field of useful intensity capable of being detected at a distance of the order of 1500 feet by aircraft borne receiving means positioned above the conductor.

11. The system of claim 9 in which said pickup means includes means to measure the intensity of the field to which it responds so that the craft can be guided along a slope trajectory of uniform field intensity for effecting a landing when visibility is low.

12. The system of claim 9 in which a guide conductor parallels the first conductor is energized at the same frequency to generate a magnetic field and is arranged to maintain the phase therein constant throughout its length, magnetic field responsive means on said aircraft, means to combine signals from said transmitting means and said magnetic field responsive means whereby to synchronously rectify the latter, and means to display the output of said rectification as an indication of the altitude of the craft above said guide conductor.

13. The system of claim 10 in which the potential of the alternating current in said conductor is of the order of 10,000 to 100,000 volts.

14. The system of claim 9 in which the change in phase of the current from end to end of the said conductor is not greater than 90 degrees.

15. An instrument landing system for aircraft, comprising in combination, means to generate from ground level an elongated fluctuating magnetic field of one phase and direction, means to generate two fluctuating magnetic fields of the same frequency, in the opposite transverse direction to the first, and substantially symmetrically disposed on opposite sides of and in respect thereto, the disposition of said means being such that the resultant transverse, horizontal magnetic field strength is substantially constant along a line vertically above the first means and substantially meeting the ground at one end and progressively increases in altitude therefrom, means carried by an aircraft to convert said resultant horizontal field to an electric signal and means to indicate the effective strength thereof whereby the craft may be guided along a slope line path of substantially uniform horizontal field strength.

16. The landing system of claim 14 in which means is provided on said aircraft to synchronously rectify said signal, said indicating means being constructed to respond to the rectified signal to indicate aircraft heading in respect to the phase of said first field.

17. A system for establishing a guide slope trajectory of substantially uniform electrostatic potential from an approach position to a touch-down point on a landing strip including in combination, a conductor extending at least above ground level substantially along the ground projection of the desired guide slope trajectory downward from said point, means energizing said conductor with a fixed, sonic frequency alternating current applied at the approach end with sufficient potential to establish an electrostatic field of useful intensity at guide slope height at the approach position, return path means completing the conductor circuit and providing a controlled spatial field of less intensity than that of the conductor, branch circuits spaced along said conductor and connecting it to said return means, reactance components in each branch so sized and connected that the current in the conductor is progressively decreased from the energizing means to touch-down position with consequent successive detectable changes in phase and electrostatic field strength.

18. The system of claim 17 in which means is provided to establish a detectable field of the same frequency and at least the same range as said electrostatic field but of constant phase throughout the length of said guide slope trajectory.

19. For response to the fields established by the system of claim 18, airborne apparatus including separate means for detecting the two fields and means for so combining the detected field signals as to indicate instantaneous phase differences therebetween for interpretation as distance remaining to the touch-down point.

20. For response to the fields established by the system of claim 18, airborne apparatus including means for detecting the amplitude of the electrostatic field, means for rectifying the amplitude signal and means responsive to the other detectable field for synchronizing said rectification to insure that the aircraft is travelling in the proper direction along the guide slope trajectory.

No references cited.

NEIL C. READ, *Primary Examiner.*

A. H. WARING, *Assistant Examiner.*